United States Patent
Joshi et al.

(10) Patent No.: US 11,570,057 B2
(45) Date of Patent: Jan. 31, 2023

(54) SYSTEMS AND METHODS FOR CONTEXTUAL TRANSFORMATION OF ANALYTICAL MODEL OF IOT EDGE DEVICES

(71) Applicant: Honeywell International Inc., Charlotte, NC (US)

(72) Inventors: Ramchandra Joshi, Montville, NJ (US); Kirupakar Janakiraman, Tamil Nadu (IN); Narayanan Srinivasan, Tamil Nadu (IN); GaneshKumar Nagaraj, Tamil Nadu (IN); Karthick Sengodan, Tamil Nadu (IN); Nilesh Desai, Parsippany, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/334,414

(22) Filed: May 28, 2021

(65) Prior Publication Data

US 2021/0288887 A1    Sep. 16, 2021

Related U.S. Application Data

(63) Continuation of application No. 16/128,236, filed on Sep. 11, 2018, now Pat. No. 11,050,634.

(51) Int. Cl.
*G06F 17/00* (2019.01)
*H04L 41/14* (2022.01)
*H04L 67/12* (2022.01)
*G06N 20/00* (2019.01)

(52) U.S. Cl.
CPC .......... *H04L 41/145* (2013.01); *G06N 20/00* (2019.01); *H04L 67/12* (2013.01)

(58) Field of Classification Search
CPC ................................................. G06F 17/5022
USPC ..................................................... 703/16, 21
See application file for complete search history.

(56) References Cited

U.S. PATENT DOCUMENTS

| | | | |
|---|---|---|---|
| 10,182,045 B2 | 1/2019 | Banga et al. | |
| 10,795,337 B2 * | 10/2020 | Bowers | ............... G05B 19/406 |
| 2017/0192414 A1 | 7/2017 | Mukkamala et al. | |
| 2017/0220641 A1 | 8/2017 | Chi | |
| 2017/0242555 A1 | 8/2017 | Wragg | |

(Continued)

OTHER PUBLICATIONS

Graph Transform Tool; retrieved on Sep. 7, 2018 from https://github.com/tensorflow/tensorflow/blob/r1.7/tensorflow/tools/graph_transforms/README.md.

(Continued)

*Primary Examiner* — Andy Ho
(74) *Attorney, Agent, or Firm* — Bookoff McAndrews PLLC

(57) ABSTRACT

Disclosed are methods, systems, and non-transitory computer-readable medium for a contextual transformation of an analytical model for an industrial internet of things (IIoT) edge node. For instance, the method may include receiving the analytical model from a cloud service; obtaining local data of the IIoT edge node; analyzing the local data to determine a situational context of the IIoT edge node; determining whether to transform the analytical model based on a fit between the analytical model and the situational context; and in response to determining to transform the analytical model, transforming the analytical model based on the situational context to derive a transformed analytical model.

20 Claims, 7 Drawing Sheets

(56) References Cited

U.S. PATENT DOCUMENTS

2018/0084073 A1   3/2018  Walsh
2018/0165386 A1   6/2018  Soundiramourthy et al.
2019/0012610 A1   1/2019  Geguine

OTHER PUBLICATIONS

NGraph: A New Open Source Compiler for Deep Learning Systems (Mar. 19, 2018); retrieved on Sep. 7, 2018 from https://ai.intel.com/ngraph-a-new-open-source-compiler-for-deep-learning-systems/.
TensorFlow in other languages; retrieved on Sep. 7, 2018 from https://www.tensorflow.org/extend/language_bindings.

* cited by examiner

SYSTEMS AND METHODS FOR CONTEXTUAL TRANSFORMATION OF ANALYTICAL MODEL OF IOT EDGE DEVICES

CROSS-REFERENCE TO RELATED APPLICATION(S)

This patent application is a continuation of and claims the benefit of priority to U.S. Nonprovisional patent application Ser. No. 16/128,236, filed on Sep. 11, 2018, the entirety of which is incorporated herein by reference.

TECHNICAL FIELD

Various embodiments of the present disclosure relate generally to an edge (e.g., edge nodes) of an industrial internet of things (IIoT) system and, more particularly, to systems and methods for contextual transformation of an analytical model at the edge.

BACKGROUND

Normally, an edge platform of an IIoT system contains a fixed set of applications, including specific analytics. Before deploying an edge platform (e.g., a node), a plan is made regarding which devices to connect to the node. Usually additional device types cannot be dynamically connected because the node does not contain the software applications to service the additional device type(s).

Specifically, in an IIoT environment, the right kind of analytic model for the situation or context of the node may not always be available on the node. Since nodes may have limited resources, it may be difficult to persist all analytical models and, even if the node can persist all analytical models, it would not be an efficient utilization of resources. Further, if the node is offline or not connected to the cloud, the node may not have access to the appropriate analytical model (e.g., by requesting the appropriate analytical model from the cloud). Moreover, execution runtimes for the analytical models may vary between, for example, gateway devices and mobile devices.

Therefore, the analytical models trained in the cloud are sometimes not directly applicable at the edge node, unless the analytical models are synchronized or transformed appropriately to get adapted to the edge environment.

The present disclosure is directed to overcoming one or more of these above-referenced challenges.

SUMMARY OF THE DISCLOSURE

According to certain aspects of the disclosure, systems and methods are disclosed for a contextual transformation of an analytical model for an industrial internet of things (IIoT) edge node.

For instance, the method may include receiving the analytical model from a cloud service; obtaining local data of the IIoT edge node, the local data including at least one of live stochastic data, asset models, super-system information, sub-system information, or performance metrics; analyzing the local data to determine a situational context of the IIoT edge node, the situational context of the IIoT edge node including at least one of sensor context or domain context; determining whether to transform the analytical model based on a fit between the analytical model and the situational context; and in response to determining to transform the analytical model, transforming the analytical model based on the situational context to derive a transformed analytical model.

Further, an industrial internet of things (IIoT) edge node, for contextual transformation of an analytical model, may include a memory storing instructions; and a processor executing the instructions to perform a process. The process including: receiving the analytical model from a cloud service; obtaining local data of the IIoT edge node, the local data including at least one of live stochastic data, asset models, super-system information, sub-system information, or performance metrics; analyzing the local data to determine a situational context of the IIoT edge node, the situational context of the IIoT edge node including at least one of sensor context or domain context; determining whether to transform the analytical model based on a fit between the analytical model and the situational context; and in response to determining to transform the analytical model, transforming the analytical model based on the situational context to derive a transformed analytical model.

Moreover, a non-transitory computer-readable medium storing instructions that, when executed by an industrial internet of things (IIoT) edge node, may cause the IIoT edge node to perform a method for contextual transformation of an analytical model. The method including receiving the analytical model from a cloud service; obtaining local data of the IIoT edge node, the local data including at least one of live stochastic data, asset models, super-system information, sub-system information, or performance metrics; analyzing the local data to determine a situational context of the IIoT edge node, the situational context of the IIoT edge node including at least one of sensor context or domain context; determining whether to transform the analytical model based on a fit between the analytical model and the situational context; and in response to determining to transform the analytical model, transforming the analytical model based on the situational context to derive a transformed analytical model.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to an edge (e.g., edge nodes) of an industrial internet of things (IIoT) system and, more particularly, to systems and methods for contextual transformation of an analytical model at the edge.

In general, the present disclosure is directed to the use of an edge node to transform an analytical model based on the situational context. As described in more detail below, the edge node may analyze various data of the edge node and the environment in which the edge node is deployed to identify the local context for executing the analytical model, then the edge node may transform the analytical model, which was trained in a cloud environment, based on the local context. It should be appreciated that the transformation of analytical models, as explained in further detail below, is distinct from model tuning, which involves changing certain parameter values to increase the accuracy of the analytical model. On the other hand, transformation of analytical models, as described herein, involves adapting or converting the analytical model to run on multiple types of target edge node environments. Target edge nodes may have for instance varying CPU, memory, and storage footprints. Transformation does not change the functionality of the model algorithm but it enables execution of the model in a specific target environment. Therefore, because an edge node may transform an analytical model, the model designer (e.g., a machine learning-trained computer, artificial intelligence, and/or a data scientist) does not have to know the actual target environment in which the analytical model is intended to run.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Figure 1:
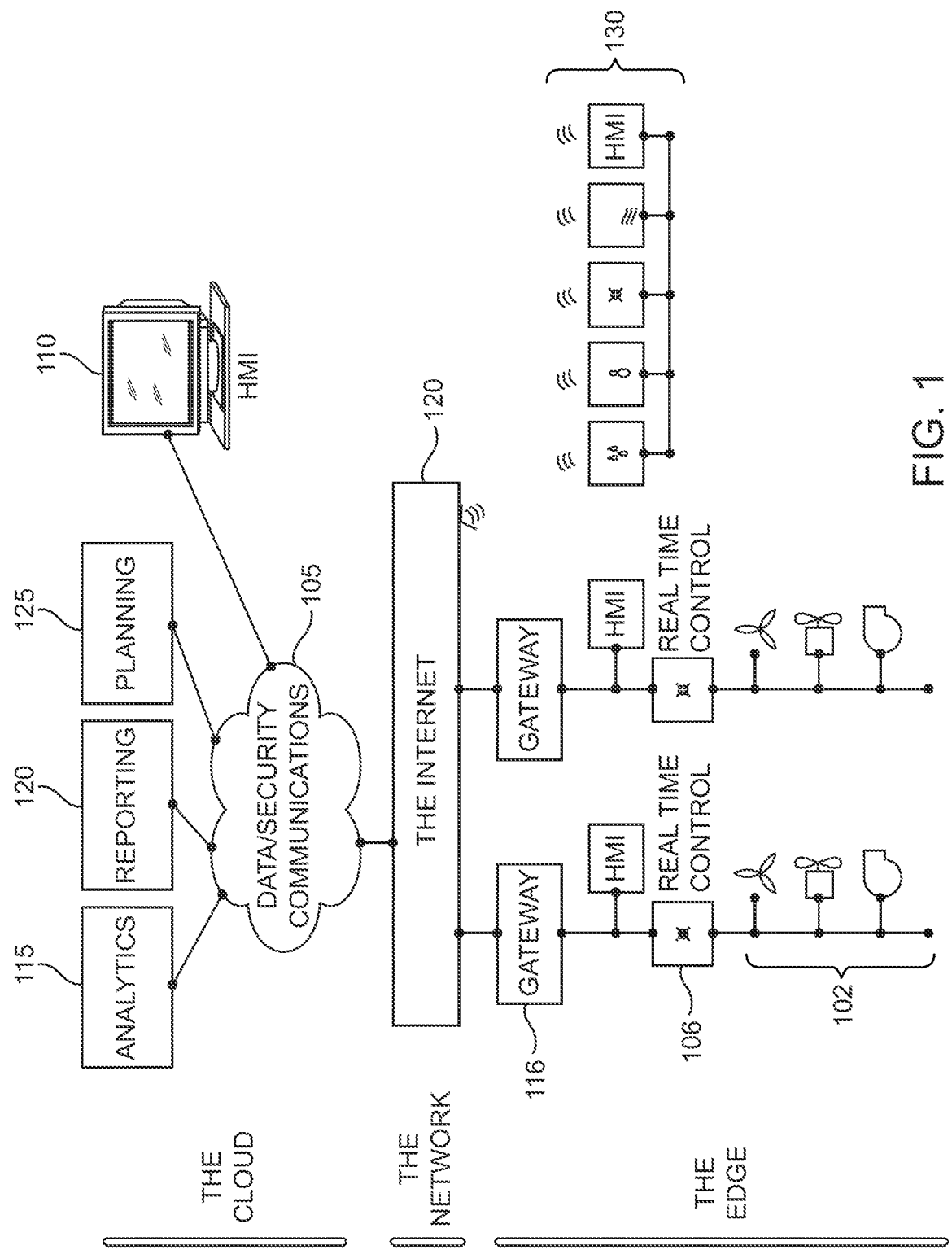
FIG. 1 illustrates components of an Industrial Internet of Things (IIoT) environment, according to one or more embodiments.

FIG. 1 illustrates components of an Industrial Internet of Things (IIoT) environment, according to one or more embodiments. As shown in FIG. 1, an IIoT environment may be organized in three primary layers (Cloud, Network, and the Edge).

The edge layer may include one or more sensors, actuators, or other devices 102, real time controllers 106, gateways 116, and a human-machine interface (HMI) 110. Real time controllers 106 may control one or more smart network ready devices 130. The network layer (e.g. the Internet 120) may include any suitable wired or wireless network, such as, for example, a local area network (LAN), wide area network (WAN), Ethernet, wireless fidelity (Wi-Fi), IEEE 802.11, Bluetooth or other short-range radio communication, near field communication, or any combination thereof. The cloud layer may include data and security communications modules 105, modules for analytics 115, reporting 120, and planning 125, and a HMI 110.

An Edge Platform may comprise one or both of a gateway 116 and a real time controller 106. Details of the Edge Platform are discussed below, for example in FIGS. 2 and 6.

Figure 2:
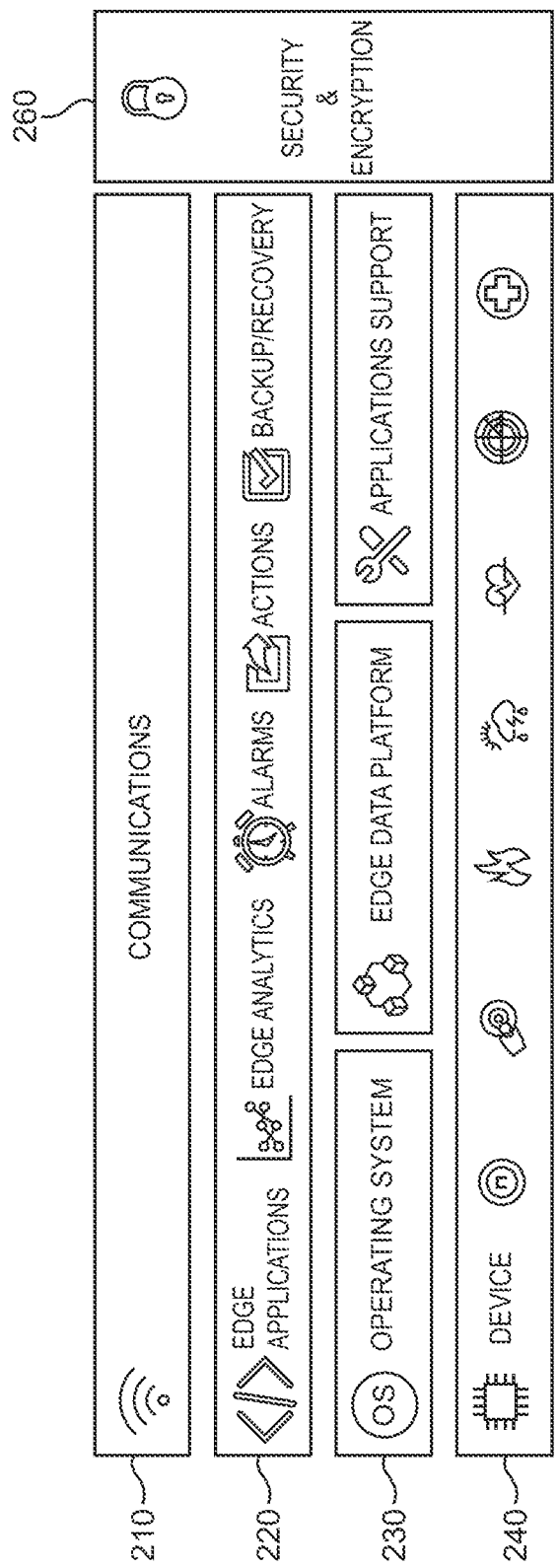
FIG. 2 illustrates an exemplary edge platform thru communications architecture layers of an Industrial Internet of Things (IIoT) environment, according to one or more embodiments.

FIG. 2 illustrates an exemplary edge platform as defined by communications architecture layers of an Industrial Internet of Things (IIoT) environment, according to one or more embodiments. As shown in FIG. 2, the Edge platform (edge node or IIoT edge node) may generally include multiple layers, including a communications layer 210, an applications layer 220, an operating system layer 230, and devices interface layer 240. Security and encryptions layer 260 may extend among and between the plurality of layers of the edge node IIoT platform.

In one embodiment, the edge node software may include an operating system layer 230 (with an operating system O/S, edged data platform for data storage and management of data, and application support), a security and encryption module 260, a communications module 210, and interfaces 240 for one or more connected devices. The applications layer 220 of the edge node may contain applications from among a pre-determined set of edge applications, analytics, alarm management, actions, and backup/recovery. Typically, a configuration of which devices will connect to the node may be planned before deploying an edge node. Devices may connect to the edge node using protocols such as ZigBee, Z-Wave, BLE, OPC UA, BACNet, and the like.

The edge platform may be (1) at the low end, an embedded system, and (2) at the high end, a server class system. The edge platform infrastructure may include a central processing unit (CPU), memory, storage, network connection(s) to the cloud (for example the Internet 120 of FIG. 1), and connection(s) to controllers, devices and sensors (for example sensors, actuators, or other devices 102 of FIG. 1). The edge platform may run command and control applications, process stream and batch analytics, and send device generated telemetry data to the cloud. Similarly, data originating in the cloud may be sent to the edge platform to be processed by (1) edge platform or (2) transmitted to various devices (for example sensors, actuators, or other devices 102). The edge platform may be a secure computing environment in which data communication between the edge platform to the cloud, as well as data communication between the edge platform and the various devices, is encrypted. the edge platform may also be called a node. Nodes are generally distributed closer to the various devices (in a hierarchal manner), but do not necessarily have to be physically proximately located to the various devices.

As mentioned above, the edge platform may receive data from the devices and sensors (for example sensors, actuators, or other devices 102 of FIG. 1). The received data may include two kinds of the data (1) data regarding discrete events and data regarding continuous events. Discrete events may be an event that occurs at time t and t+p, where there are considered to have been two separate event instances (e.g. a door open, lights on). Continuous events may be an event instance lasting for at least time p, where an event occurring at time t and t+p, cannot be considered as two separate events (e.g. raining, having a shower, driving a car). Collectively, this data may be called "stochastic data."

Figure 3:
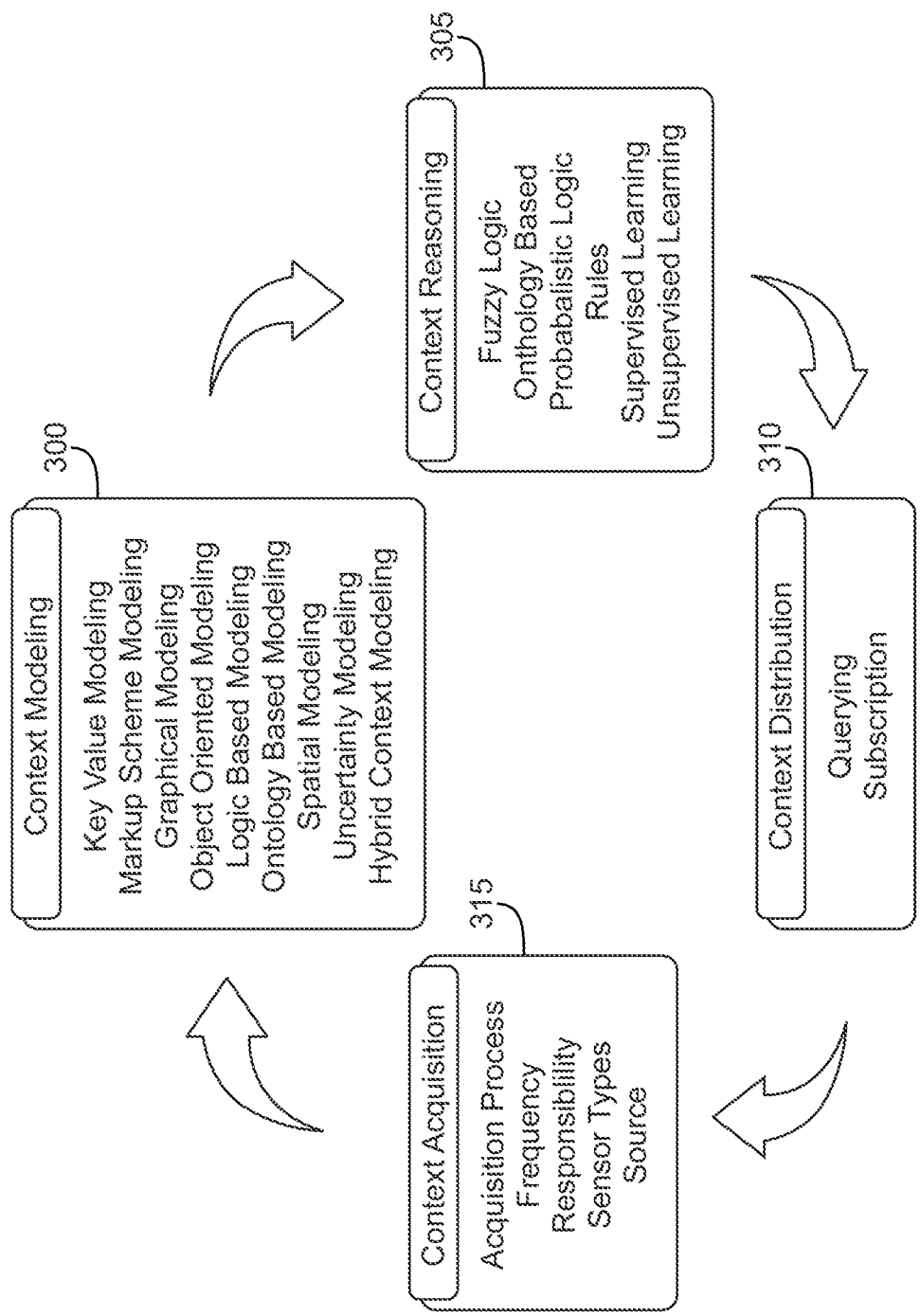
FIG. 3 illustrates a diagram of a typical context analysis life cycle in the IIoT system, according to one or more embodiments.

FIG. 3 illustrates a diagram of the typical context analysis life cycle in the IIoT system, according to one or more embodiments. The context analysis life cycle may express how edge data (e.g., from sensors, actuators, or other devices 102 of FIG. 1) is collected, modeled, and processed, and how knowledge is extracted from the collected data. As shown in FIG. 3, the typical context analysis life cycle includes context modelling 300, context reasoning 305, context distribution 310, and context acquisition 315. As shown in FIG. 2, context acquisition 315 feeds into context modelling 300, context modelling 300 feeds into context reasoning 305, context reasoning 305 feeds into context distribution 310, and context distribution 310 feeds into context acquisition 315, which uses new insights, if any, from extracted knowledge.

In context acquisition 315, the data is acquired from various physical and virtual devices (e.g., from sensors, actuators, or other devices 102 of FIG. 1). For instance, context acquisition 315 may include information about an acquisition process, frequency, responsibility, sensor types, and/or source.

In context modeling 300, the data is modeled according to meaningful data. The modelling may be based on one or a combination of: (1) key value modelling, (2) markup scheme modelling, (3) graphical modelling, (4) object oriented modelling, (5) logic based modelling, (6) ontology based modelling, (7) spatial modelling, (8) uncertainty modelling, and (9) hybrid context modelling.

In context reasoning 305, the data is processed, and then knowledge is extracted. Processing and extracting may be based on one or a combination of: (1) fuzzy logic, (2) ontology based probabilistic logic, (3) rules, (4) supervised learning, and (5) unsupervised learning.

In context distribution 310, the extracted knowledge is distributed via servers. For instance, the distribution may be accomplished by one or a combination of: querying and subscription.

Figure 4:
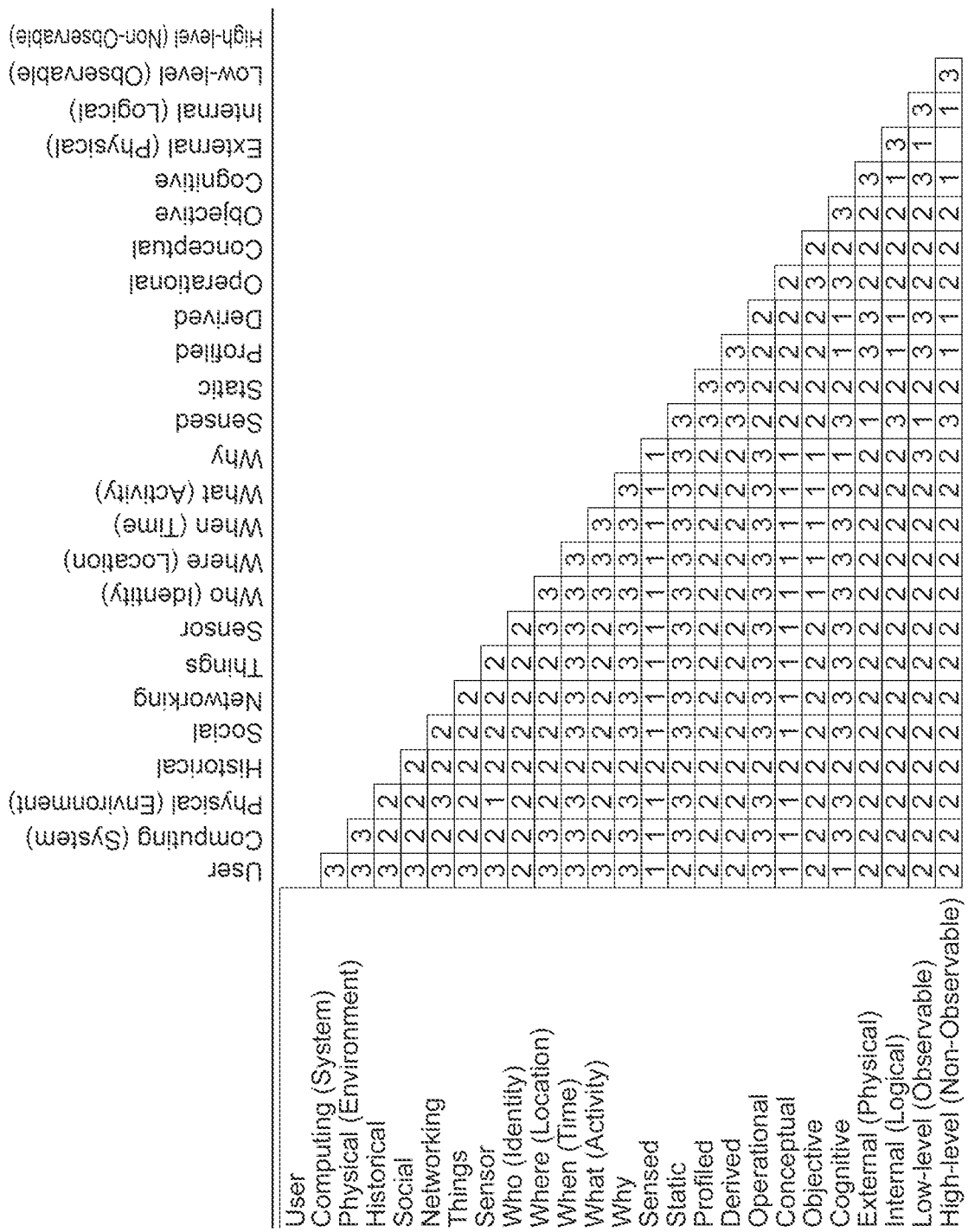
FIG. 4 illustrates a diagram of relationships between key parameters which influence a context of an IIoT Application which is running in an Edge Node, according to one or more embodiments.

FIG. 4 illustrates a diagram of relationships between key parameters which influence a context of an IIoT application which is running in an edge node, according to one or more embodiments.

Specifically, as shown in FIG. 4, diagram 400 illustrates context mapping between different parameters of a node, where (P) denotes a row label and (Q) denotes a column label, then: 1 means (P)≈(Q) very high; 2 means (P)≈(Q) moderate; and 3 means (P)≈(Q) very low. Parameters may include: user, computing (system), physical (environment), historical, social, networking, things, sensor, who (identify), where (location), when (time), what (activity), why, sensed, static, profiled, derived, operational, conceptual, objective, cognitive, external (physical), internal (logical), low-level (observable), and/or high level (non-observable). For instance, the intersection of sensor and physical (environment) is very high.

A node may obtain local data of the node (for instance at least one of live stochastic data, asset models, super-system information, sub-system information, or performance metrics, discussed below in relation to FIG. 5). The node may analyze the local data to determine a situational context of the node by determining a result for the parameters in FIG. 4. For instance, the node may calculate a value (or values) based on the local data and the values in FIG. 4, and the value(s) may represent the situational context of the node.

Figure 5:
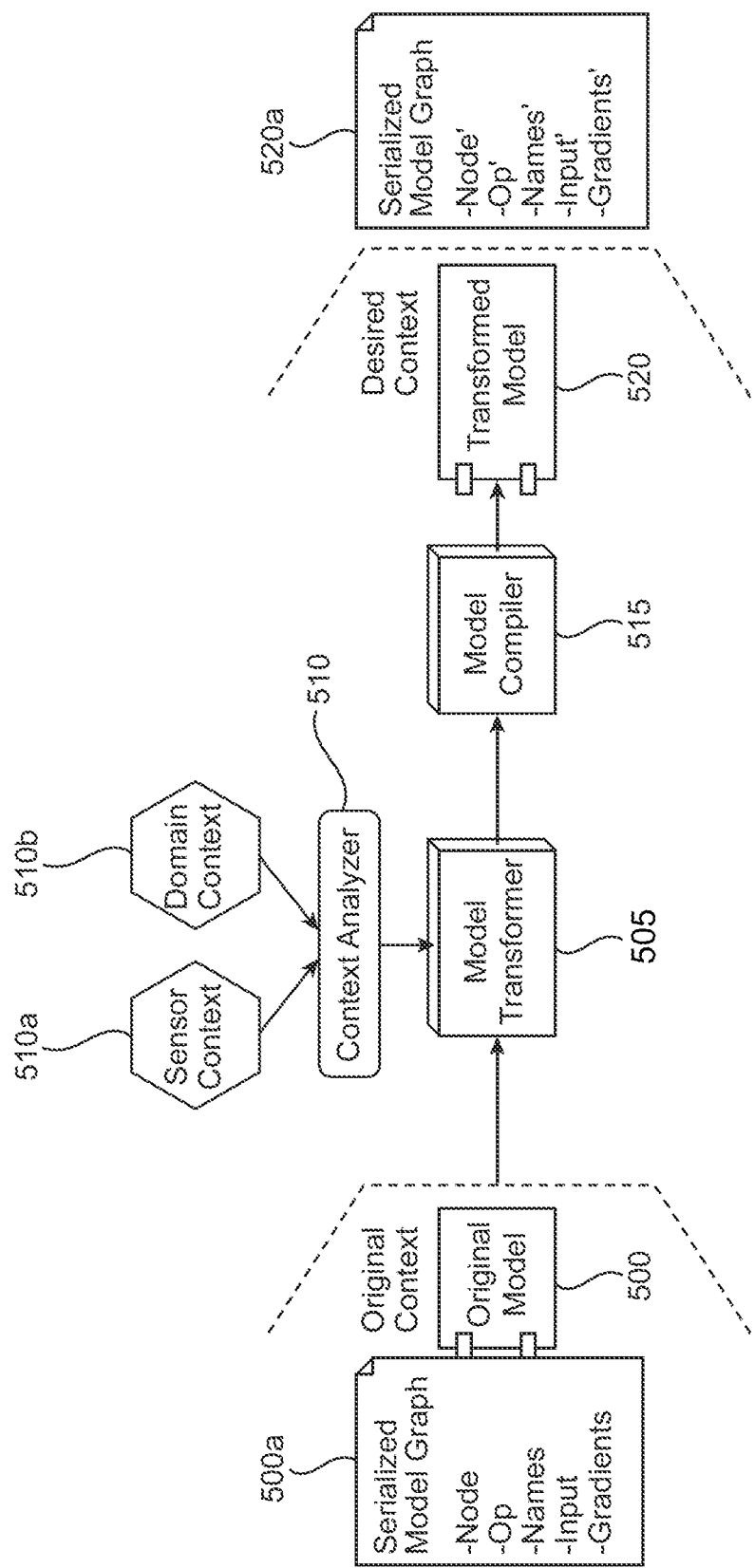
FIG. 5 illustrates a block diagram for a contextual transformation of an analytical model for an Industrial Internet of Things (IIoT) edge node, according to one or more embodiments.

FIG. 5 illustrates a block diagram for a contextual transformation of an analytical model for an industrial internet of things (IIoT) edge node, according to one or more embodiments.

A model transformer 505 may receive (1) a serialized model graph 500a of an original model 500 (an "analytical model") and (2) a situational context from a content analyzer 510. Context analyzer 510 may receive (1) sensor context 510a and (2) domain context 510b, and output the situational context to the model transformer 505.

Specifically, the context analyzer 510 may determine the situational context by correlating the stochastic data discussed above and one or more of (1) ontology information/asset model, (2) super system information, (3) sub system information, (4) performance metrics, and (5) other physical/logical dimensions. Ontology information/asset model may include information about a hierarchy of devices in a specific domain, for instance information about one or more of: how devices are connected to another device, how the devices form a family, and how the devices communicate with each other. Super system information may include information about how a specific node (as deployed) is connected or interacts with other devices and what, if any, other nodes are in the same environment, for instance information about one or more of: devices connected below the specific node, what router/gateway/local network/wide area network the specific node communicates with to connect to the cloud, and other nodes in the same environment operating parallel to the specific node. Sub system information may include information about a configuration of the specific node (as deployed), for instance information about one or more of: number of processors and type(s), number of data storages and type(s), other hardware information of the specific node, and software runtime of the node including behavior parameters of the node. Performance metrics may include one or more of response time, throughput, computing resources, bandwidth, latency, and power consumption.

Sensor context 510a includes data from the above data and information relative to the sensors and devices (e.g., sensors, actuators, or other devices 102 of FIG. 1). Domain context 510b includes data from the above data and information relative to the edge platform.

After the model transformer 505 determines that the original context of the original model 500 does not match the desired context of the IIoT edge node (i.e., the original context of the analytical model does not fit the situational context of the IIoT edge node), the model transformer 505 transforms the original model by outputting information to the model compiler 515. The model compiler 515 outputs a transformed model 520, with a serialized model graph 520*a*. This transformation may make the transformed model 520 work in new hardware environments, thus providing hardware agnostic support for analytical models. For instance, when the domain context indicates that the edge node is a small platform device, the transformation may transform the analytical model to reduce memory and storage requirements for the analytical model; when the domain context indicates that rapid processing is required (e.g., because of safety concerns), the transformation may transform the analytical model to reduce latency.

An example process may include:

(1) Export an original model 500 (existing analytical model) into a serialized model graph 500*a*. For example, to create a serialized model graph 500*a*, the original model 500 may load the graph definition of the original model 500, pull in values for all of the variables from a latest checkpoint file, and then replace each variable OP with a constant that has the numerical data for the weights stored in its attributes, then strip away all the extraneous nodes of the graph definition that are not used for forward inference, and save out the resulting graph definition into an output file. The resulting graph definition may include (1) nodes, (2) names, (3) operations (OPs), (4) inputs, (5) devices, and/or (5) attributes. Definition of weights, bias and checkpoints may remain intact in the resulting graph definition.

(2) The model compiler will apply and compile the above-mentioned parameters to match with the desired context based upon the meta data that is available.

For instance, the transformation process may perform one or sequential combinations of: (1) remove unused nodes; (2) collapse sub-graphs that evaluate to constant expressions to a constant; (3) add default attributes to operations; (4) converting newer versions of operations to older versions (or vice versa); (5) optimize away a Mul that is introduced after a Conv2D (or a MatMul) when batch normalization has been used during training; (6) quantize calculations from floating-point to eight-bit (or vice versa); (7) fusing specific combinations of patterns of operations to improve memory usage and latency (e.g., ResizeBilinear or MirrorPad ops before convolutions by fusing the spatial transformations with the convolution's im2col patch generation); (8) merging duplicate nodes; (9) quantize nodes; (10) quantize weights; (11) remove specified devices from operations; (12) remove control dependencies; (13) round all float values; and (14) change gather operations to hash table operations.

Additionally, the transformation may also enable one or more of: (1) mapping and translation of analytical model notations from one language/technology to another; (2) Converting the Physical structure of the model to another in order to get executed/compatible with a new hardware/AI processor environment and became hardware agnostic; (3) mapping and translation of analytical models for a particular domain from one language/format to another; (4) mapping and translation one XML/frozen graph (or other) format to another for an analytical model; (5) mapping and translation of meta-models; and (6) supporting bi-directional consistency management between complex models.

Figure 6:
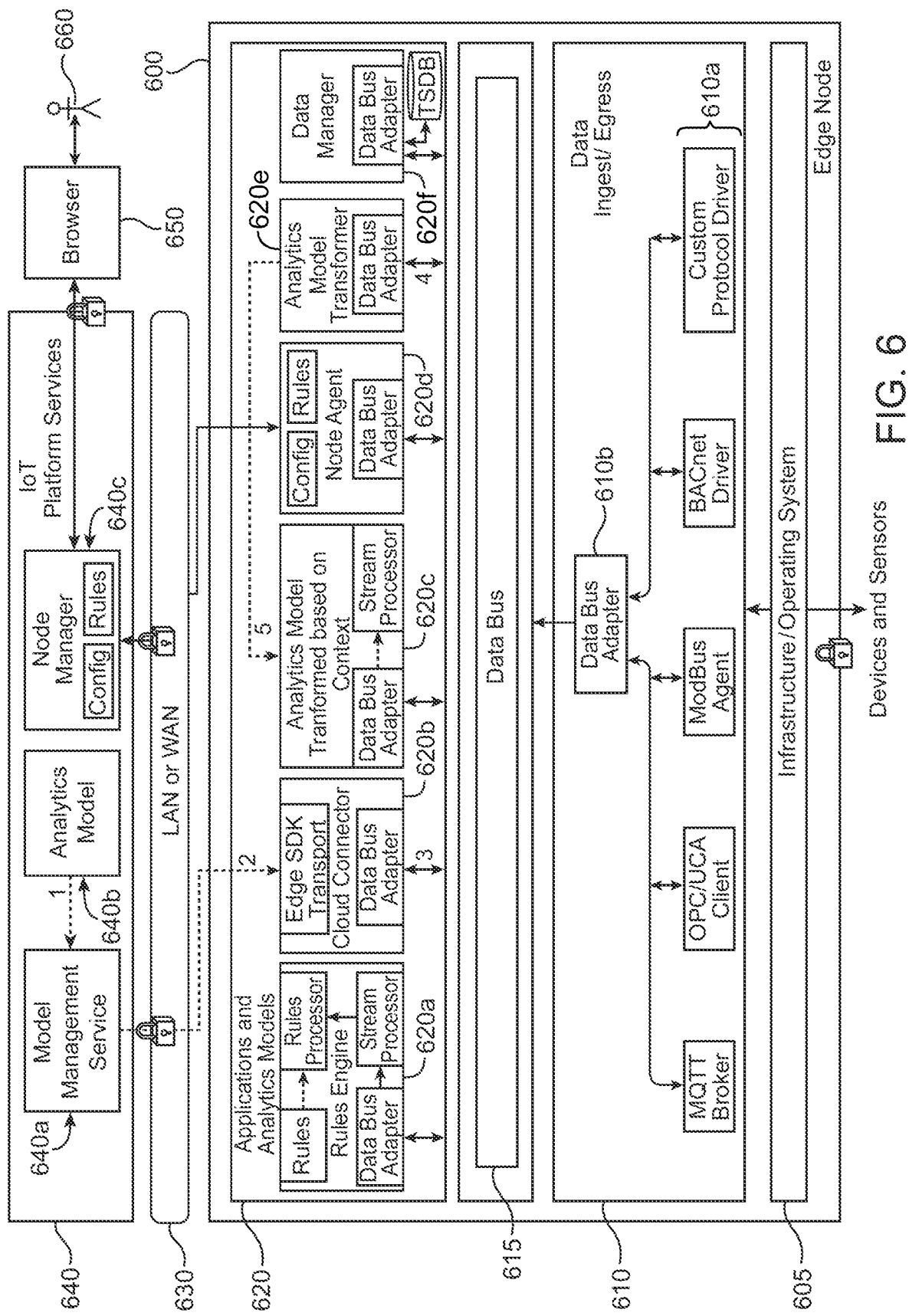
FIG. 6 illustrates a system block diagram of an exemplary system for a contextual transformation of an analytical model for an industrial internet of things (IIoT) edge node, according to one or more embodiments.

FIG. 6 illustrates a system block diagram of an exemplary system for an industrial internet of things (IIoT) edge node for contextual transformation of an analytical model for, according to one or more embodiments.

As shown in FIG. 6, the exemplary system may have three layers (1) data ingress/egress layer, (2) applications and analytics models layer, and (3) IoT platform layer. Specifically, the exemplary system may include edge node 600, LAN or WAN 630, IoT platform services 640, and browser 650 (accessible and controllable by user(s) 660).

IoT platform services 640 may include model management service 640*a*, analytics model 640*b*, and node manager 640*c*. Analytical models may be stored as analytics model 640*b*, which may be stored in a memory in the IoT platform services 640. Further, IoT platform services 640 may provide various services including IIoT services such as device management, device provisioning, data services, etc. Data scientists develop analytical models and store the analytical models in memory in the IoT platform service 640, the analytical models being based on the data received from various edge nodes, like edge node 600. The model management service 640*a* may be responsible for pushing the analytical model 640*b* to the edge nodes, like edge node 600. Further, the node manager 640*c* monitors the health of the edge nodes, like edge node 600. The node manager 640*c* also provides a user interface (accessible by browser 650) to the user(s) 660 so that user(s) 660 may define the rules and configurations that are downloaded into the edge nodes, like edge node 600.

Edge node 600 may include infrastructure/operating system 605, data ingest/egress 610, data bus 615, applications and analytics models 620.

Data ingest/egress 610 may include a data bus adapter 610*b* and various brokers, clients, agents, and drivers 610*a* that communicate with various devices and sensors (e.g., sensors, actuators, or other devices 102 of FIG. 1). Brokers, clients, agents, and drivers 610*a* may include a Message Queuing Telemetry Transport (MQTT) broker, OPC/UCA client, ModBus Agent, BACnet Driver, or custom protocol driver. Data bus adapter 610*b* may collect data from brokers, clients, agents, and drivers 610*a* and transmit it to the data bus 615 (and vice versa: data from data bus 615 to brokers, clients, agents, and drivers 610*a*).

Applications and analytics models 620 may include rules engine 620*a*, cloud connector 620*b*, analytics model 620*c*, node agent 620*d*, analytics model transformer 620*e*, and data manager 620*f*. The applications and analytics models 620 may be executed by one or more processors that are connected to the data bus 615. Further, the one or more processors or the date bus 615 may be connected to a memory that may store the various instructions, rules, analytical models, and data from the various devices and sensors or data from the IoT platform service 640. For instance, the memory may store some data in a Time Series Database (TSDB) that is controlled by the data manager 620*f*.

Further, the applications and analytics models 620 include the applications that process data sent by the sensors/devices, for instance the rules engine 620*a* and analytics model 620*c*. The rules engine 620*a* may be used to apply rules defined by the user to incoming data. The cloud connector 620*b* is the bridge that connects the edge node 600 to the IoT platform service 640 in the cloud, by the LAN or WAN 630. The node agent 620*d* communicates with the node manager 640*c* in the IoT platform service 640 in the cloud, by the LAN or WAN 630, and brings the rules of the rules engine 620*a* as well as configuration data from the IoT platform service 640 in the cloud to the edge node 600. The data manager 620*f* handles all the data that needs to be stored temporarily/permanently and locally on the edge node 600.

All the components in the applications and analytics models 620 are depicted as communicating over the data bus 615. However, this is merely a depiction as the communications between the different applications may be accomplished (1) by processing sequences on a single processor, (2) by flags in memory for various processing sequences on a single processor or different processors, or (3) by signals between the different processors.

Based on the local context, the analytics model transformer 620e transforms the analytical model received from the IoT platform service 640 in the cloud into a transformed analytical model (for instance, as discussed above with respect to FIG. 5).

Example (See the numbered lines in FIG. 6 for reference): (1) a data scientist develops an analytical model and stores it in the Analytics Model 640b, and makes the analytical model available to the model management service 640a for distribution to the edge node(s), like edge node 600. (2) The model management service 640a may push the analytical model down to the edge node 600 through the LAN or WAN 630 and to the cloud connector 620b of the edge node 600. (3) The cloud connector 620b may publish the "Analytical Model is available" event on the data bus 615. (4) The analytics model transformer 602e, which has subscribed to the "Analytical Model is available" event, may receive the event and thereby receive the analytical model. (5) The analytics model transformer 620e transforms the analytical model based on the local context, and pushes the transformed analytical model to the analytics model 620c so that the analytics model 620c (now transformed based on context) may start processing new data to determine outputs.

In another embodiment, the edge node 600 may monitor the local context of the edge node 600 (e.g., after the edge node 600 first transforms the analytical model). In response to detecting a change in the local context, the edge node 600 may transform the analytical model based on the changed local context.

Figure 7:
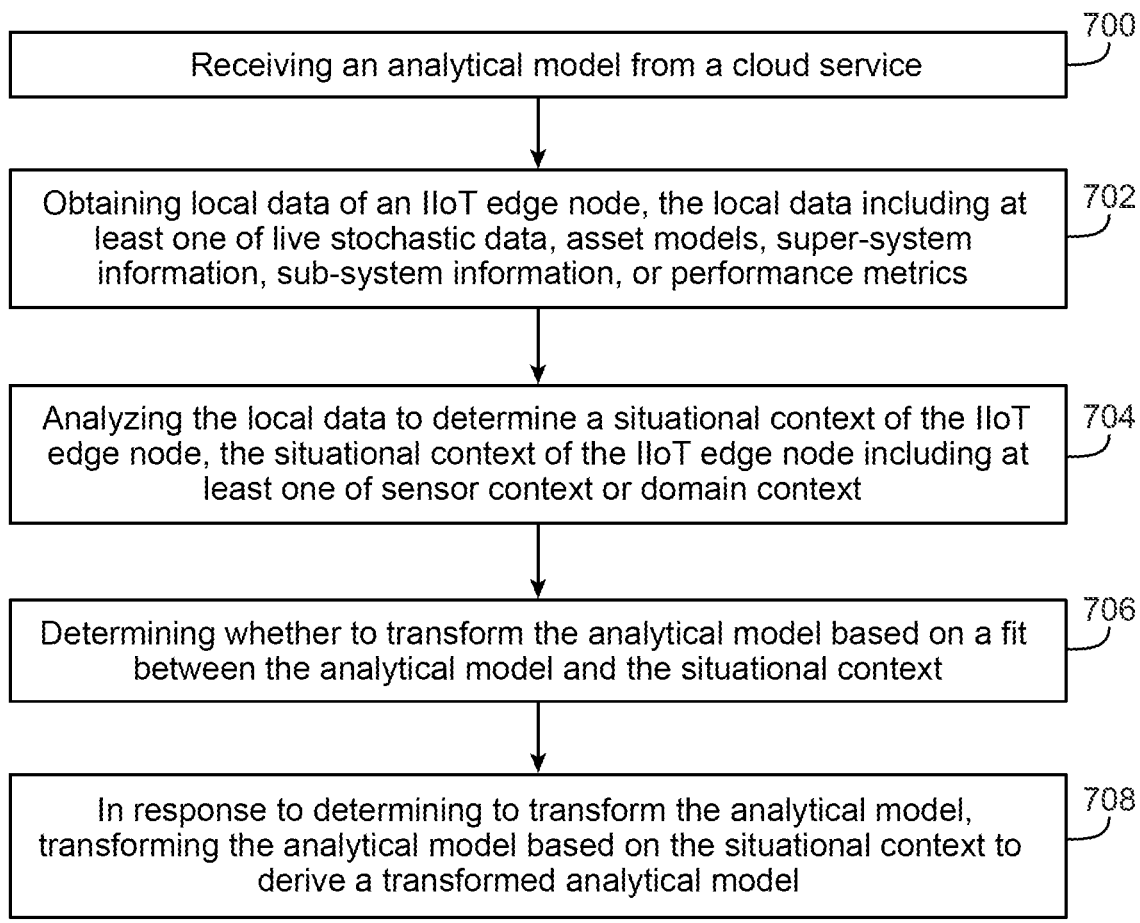
FIG. 7 illustrates a flow chart of an exemplary method for a contextual transformation of an analytical model for an industrial internet of things (IIoT) edge node, according to one or more embodiments.

FIG. 7 illustrates a flow chart of an exemplary method for a contextual transformation of an analytical model to be executed an industrial internet of things (IIoT) edge node, according to one or more embodiments. The method may include: receiving an analytical model from a cloud service (block 700); obtaining local data of an IIoT edge node, the local data including at least one of live stochastic data, asset models, super-system information, sub-system information, or performance metrics (block 702); analyzing the local data to determine a situational context of the IIoT edge node, the situational context of the IIoT edge node including at least one of sensor context or domain context (block 704); determining whether to transform the analytical model based on a fit between the analytical model and the situational context (block 706); in response to determining to transform the analytical model, transforming the analytical model based on the situational context to derive a transformed analytical model (block 708).

FIGS. 1 through 7 and the disclosure provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 through 7. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for a contextual transformation of an analytical model for an industrial internet of things (IIoT) edge node, comprising:
   receiving the analytical model from a cloud service;
   obtaining local data of the IIoT edge node;
   analyzing the local data to determine a situational context of the IIoT edge node by correlating stochastic data and one or more of (1) ontology information/asset model indicative of a hierarchy of devices in a domain, (2) super system information indicative of connection details and interaction of the IIoT edge node with other nodes, (3) sub system information indicative of a configuration of the IIoT edge node, (4) performance metrics, and (5) physical/logical dimensions;

determining whether to transform the analytical model based on a fit between the analytical model and the situational context; and in response to determining to transform the analytical model, transforming the analytical model based on the situational context to derive a transformed analytical model.

2. The method of claim 1, further comprising:

monitoring the situational context for changes; and in response to detecting a change of the situational context as indicated by the monitoring, transforming the transformed analytical model based on the change of the situational context, wherein the situational context of the IIoT edge node includes at least one of: a sensor context and a domain context, and wherein the sensor context includes information relative to sensors and devices, and the domain context includes information relative to the edge node.

3. The method of claim 1, further comprising:

obtaining stochastic data, wherein the stochastic data comprises data regarding discrete events and data regarding continuous events associated with at least one device; and applying the transformed analytical model to the stochastic data to determine outputs.

4. The method of claim 1, wherein the transforming the analytical model includes performing one or a sequential combination of:

converting newer versions of operations to older versions operations;

optimizing operations introduced during training;

quantizing calculations from floating-point to eight-bit; and fusing specific combinations of patterns of operations.

5. The method of claim 4, wherein the performing the one or the sequential combination includes:

removing unused nodes;

collapsing sub-graphs that evaluate to constant expressions to a constant;

adding default attributes to operations;

merging duplicate nodes;

quantizing nodes or weights;

removing specified devices from operations;

removing control dependencies;

rounding all float values; and changing gather operations to hash table operations.

6. The method of claim 1, wherein analyzing the local data to determine the situational context comprises:

performing a mapping between one or more parameters associated with the IIoT edge node, wherein the one or more parameters comprises: a user, a computing system, a physical environment, a location, time, and an activity; and determining one or more values for one or more of: (1) asset model information, (2) super system information, (3) sub system information, (4) performance metrics, and (5) physical/logical dimensions based on the one or more parameters, wherein the performance metrics comprises one or more of: a response time, a throughput, at least one computing resource, bandwidth, latency, and power consumption.

7. The method of claim 1, further comprising:

creating a serialized model graph based on the analytical model, in response to determining that an original context of the analytical model does not fit the situational context of the IIoT edge node, and wherein the serialized model graph comprises at least one of: a node, a name, an operation, an input, a device, and an attribute.

8. An industrial internet of things (IIoT) edge node, the IIoT edge node comprising:

a memory storing instructions; and a processor executing the instructions to perform a process including:

receiving an analytical model from a cloud service;

obtaining local data of the IIoT edge node;

analyzing the local data to determine a situational context of the IIoT edge node by correlating stochastic data and one or more of (1) ontology information/asset model indicative of a hierarchy of devices in a domain, (2) super system information indicative of connection details and interaction of the IIoT edge node with other nodes, (3) sub system information indicative of a configuration of the IIoT edge node, (4) performance metrics, and (5) physical/logical dimensions;

determining whether to transform the analytical model based on a fit between the analytical model and the situational context; and in response to determining to transform the analytical model, transforming the analytical model based on the situational context to derive a transformed analytical model.

9. The IIoT edge node of claim 8, wherein the process performed by the processor further comprises:

monitoring the situational context for changes; and in response to detecting a change of the situational context as indicated by the monitoring, transforming the transformed analytical model based on the change of the situational context, wherein the situational context of the IIoT edge node includes at least one of: a sensor context and a domain context, and wherein the sensor context includes information relative to sensors and devices, and the domain context includes information relative to the edge node.

10. The IIoT edge node of claim 8, wherein the process performed by the processor further comprises:

obtaining stochastic data, wherein the stochastic data comprises data regarding discrete events and data regarding continuous events associated with at least one device; and applying the transformed analytical model to the stochastic data to determine outputs.

11. The IIoT edge node of claim 8, wherein the transforming the analytical model includes performing one or a sequential combination of:

converting newer versions of operations to older versions operations;

optimizing operations introduced during training;

quantizing calculations from floating-point to eight-bit; and fusing specific combinations of patterns of operations.

12. The IIoT edge node of claim 11, wherein the performing the one or the sequential combination further includes:

removing unused nodes;

collapsing sub-graphs that evaluate to constant expressions to a constant;

adding default attributes to operations;

merging duplicate nodes;

quantizing nodes or weights;

removing specified devices from operations;

removing control dependencies;

rounding all float values; and changing gather operations to hash table operations.

13. The IIoT edge node of claim 8, wherein the process performed by the processor further comprises:
   performing a mapping between one or more parameters associated with the IIoT edge node, wherein the one or more parameters comprises: a user, a computing system, a physical environment, a location, time, and an activity; and
   determining one or more values for one or more of: (1) asset model information, (2) super system information, (3) sub system information, (4) performance metrics, and (5) physical/logical dimensions based on the one or more parameters, wherein the performance metrics comprises one or more of: a response time, a throughput, at least one computing resource, bandwidth, latency, and power consumption.

14. The IIoT edge node of claim 8, wherein the process performed by the processor further comprises:
   creating a serialized model graph based on the analytical model, in response to determining that an original context of the analytical model does not fit the situational context of the IIoT edge node, and wherein the serialized model graph comprises at least one of: a node, a name, an operation, an input, a device, and an attribute.

15. A non-transitory computer-readable medium storing instructions that, when executed by an industrial internet of things (IIoT) edge node, cause the IIoT edge node to perform a method, the method comprising:
   receiving an analytical model from a cloud service;
   obtaining local data of the IIoT edge node;
   analyzing the local data to determine a situational context of the IIoT edge node by correlating stochastic data and one or more of (1) ontology information/asset model indicative of a hierarchy of devices in a domain, (2) super system information indicative of connection details and interaction of the IIoT edge node with other nodes, (3) sub system information indicative of a configuration of the IIoT edge node, (4) performance metrics, and (5) physical/logical dimensions;
   determining whether to transform the analytical model based on a fit between the analytical model and the situational context; and
   in response to determining to transform the analytical model, transforming the analytical model based on the situational context to derive a transformed analytical model.

16. The non-transitory computer-readable medium of claim 15, wherein the method further comprises:
   monitoring the situational context for changes; and
   in response to detecting a change of the situational context as indicated by the monitoring, transforming the transformed analytical model based on the change of the situational context, wherein the situational context of the IIoT edge node includes at least one of: a sensor context and a domain context, and wherein the sensor context includes information relative to sensors and devices, and the domain context includes information relative to the edge node.

17. The non-transitory computer-readable medium of claim 15, wherein the method further comprises:
   obtaining stochastic data, wherein the stochastic data comprises data regarding discrete events and data regarding continuous events associated with at least one device; and
   applying the transformed analytical model to the stochastic data to determine outputs.

18. The non-transitory computer-readable medium of claim 17, wherein the transforming the analytical model includes performing one or a sequential combination of:
   converting newer versions of operations to older versions operations;
   optimizing operations introduced during training;
   quantizing calculations from floating-point to eight-bit; and
   fusing specific combinations of patterns of operations.

19. The non-transitory computer-readable medium of claim 15, wherein the method further comprises:
   performing a mapping between one or more parameters associated with the IIoT edge node, wherein the one or more parameters comprises: a user, a computing system, a physical environment, a location, time, and an activity; and
   determining one or more values for one or more of: (1) asset model information, (2) super system information, (3) sub system information, (4) performance metrics, and (5) physical/logical dimensions based on the one or more parameters, wherein the performance metrics comprises one or more of: a response time, a throughput, at least one computing resource, bandwidth, latency, and power consumption.

20. The non-transitory computer-readable medium of claim 15, wherein the method further comprises:
   creating a serialized model graph based on the analytical model, in response to determining that an original context of the analytical model does not fit the situational context of the IIoT edge node, and wherein the serialized model graph comprises at least one of: a node, a name, an operation, an input, a device, and an attribute.

* * * * *